United States Patent
Wingren et al.

(10) Patent No.: US 12,526,899 B2
(45) Date of Patent: Jan. 13, 2026

(54) DETERMINING A LIGHT SETTING OF A LIGHT SOURCE CONFIGURED TO ILLUMINATE AN INDIVIDUAL

(71) Applicant: Brainlit AB, Lund (SE)

(72) Inventors: Tord Wingren, Lomma (SE); Jakob Singvall, Bjärred (SE); Klara Singvall, Bjärred (SE); Bengt Lindoff, Bjärred (SE); Truls Löwgren, Malmö (SE)

(73) Assignee: Brainlit AB, Lund (SE)

( * ) Notice: Subject to any disclaimer, the term of this patent is extended or adjusted under 35 U.S.C. 154(b) by 29 days.

(21) Appl. No.: 18/724,714

(22) PCT Filed: Dec. 29, 2022

(86) PCT No.: PCT/EP2022/088043
§ 371 (c)(1),
(2) Date: Jun. 27, 2024

(87) PCT Pub. No.: WO2023/126500
PCT Pub. Date: Jul. 6, 2023

(65) Prior Publication Data
US 2025/0081313 A1    Mar. 6, 2025

(30) Foreign Application Priority Data
Dec. 30, 2021   (EP) ................................. 21218382

(51) Int. Cl.
*H05B 47/16*   (2020.01)

(52) U.S. Cl.
CPC ................................. *H05B 47/16* (2020.01)

(58) Field of Classification Search
None
See application file for complete search history.

(56) References Cited

U.S. PATENT DOCUMENTS

| | | | |
|---|---|---|---|
| 8,436,556 B2 * | 5/2013 | Eisele | H05B 45/48 |
| | | | 315/297 |
| 9,410,664 B2 * | 8/2016 | Krames | F21V 9/08 |
| 9,820,365 B2 * | 11/2017 | Schlangen | A61M 21/02 |
| 10,471,231 B2 * | 11/2019 | Moore-Ede | H05B 47/19 |
| 2015/0035440 A1 | 2/2015 | Spero | |
| 2016/0054023 A1 | 2/2016 | Baker | |
| 2019/0136618 A1 | 5/2019 | Hebeisen | |
| 2019/0350066 A1 | 11/2019 | Herf | |

OTHER PUBLICATIONS

International Search Report from International Application No. PCT/EP2022/088043 mailed Apr. 17, 2023.

* cited by examiner

*Primary Examiner* — Kenneth B Wells
(74) *Attorney, Agent, or Firm* — Shih IP Law Group, PLLC

(57) ABSTRACT

The present invention relates to a method for determining a light setting of a light source configured to illuminate an individual, wherein the light setting of the light source includes information about a circadian stimulus and a color temperature of light emitted by the light source.

15 Claims, 9 Drawing Sheets

DETERMINING A LIGHT SETTING OF A LIGHT SOURCE CONFIGURED TO ILLUMINATE AN INDIVIDUAL

TECHNICAL FIELD

The present invention relates to a method for determining a light setting of a light source configured to illuminate an individual. The present invention further relates to a control device for determining a light setting of a light source configured to illuminate an individual and a system thereof.

BACKGROUND OF THE INVENTION

Chronobiology, which is a field of biology that studies timing (e.g., periodic) processes and phenomena in living organisms, is becoming increasingly more important for understanding human physiology. For example, the circadian rhythm is an internal process of living organisms (e.g., humans) that regulates the sleep-wake cycle. The circadian rhythm typically repeats over a time period which, for most people, is slightly longer than 24 hours. It is also known that this cycle can be different between different individuals. For example, some persons are known to be "morning" persons, while other are "evening" persons. Hence, the behavior at a certain time of day for different individual typically varies. This is usually referred to as a person's chronotype.

An important part of chronobiology is the study of the impact of light on living organisms. As is commonly known within the field, the circadian rhythm of living organisms can be affected by light. Living organisms, for example humans and animals, typically have cells in their eyes which are sensitive to certain wavelengths of light. It has, for example, been found that exposing a person to bright light in the evening can postpone the time that person falls asleep. Recent studies have further found that light can affect a person's alertness and performance. In light of this, it would be desirable to control the light that a person is exposed to in accordance with a theoretically determined light dose to for instance enhance the person's performance, well-being, or sleep cycle. However, in practice, there are limitations to how the light can be adjusted.

SUMMARY OF THE INVENTION

As stated above, there are limitations to what light an individual can be exposed to. Hence, it is not always possible to achieve a theoretically desirable light dose for the individual due to different factors. Limiting factors may for example be limitations in the light source itself, i.e. what light spectrum or intensity the light source can achieve. Another example may be an activity of the individual that in some way limits the possible spectrum or intensity of the light.

The inventors of the present inventive concept have realized that by looking at a circadian stimulus and color temperature of the light, as well as a light space defining the possible light settings that can be achieved, an improved way of illuminating an individual with personalized light can be achieved.

According to a first aspect, a method for determining a light setting of a light source configured to illuminate an individual is provided, wherein the light setting of the light source comprises information about a circadian stimulus and a color temperature of light emitted by the light source. The method comprises: determining a target light setting of the light source based on a target light profile of the individual comprising time-resolved information about circadian stimuli and color temperatures of light that the individual is to be exposed to, and an actual light profile of the individual comprising information about circadian stimuli and color temperatures of light the individual has been exposed to, wherein the target light setting comprises information about a circadian stimulus and a color temperature of light to be emitted by the light source and is determined such that the actual light profile and the target light profile are aligned over time; comparing the target light setting with a light space, wherein the light space is a range of circadian stimuli and a range of color temperatures of light that the light source can emit; in response to the target light setting being within the light space: setting the target light setting as the light setting of the light source; and in response to the target light setting being outside the light space: determining an allowable light setting based on the target light setting and the light space, such that the allowable light setting is within the light space, and setting the allowable light setting as the light setting of the light source.

The wording "circadian stimulus" should, within the context of this disclosure, be construed as a value of an effect the light has on a circadian rhythm of the individual. Put differently, is may describe to what amount the light stimulates a circadian rhythm of the individual. As is known within the art, light with high brightness, or light comprising components of the blue spectrum can have a greater effect on the circadian rhythm compared to light of low illuminance or of other colors. Circadian stimulus may be a measure of how effective spectrally weighted irradiance is at a cornea of the individual from threshold to saturation. The circadian stimulus of light may be represented by a numerical value. The numerical value may be proportional to a degree of melatonin suppression of an individual after a time period of light exposure. The time period of light exposure may, e.g., be one hour. Typically, a numerical value of the circadian stimulus lower than 0.1 does not have a significant effect on the individual's melatonin suppression, while a numerical value of the circadian stimulus higher than 0.3 does have a significant effect. A numerical value of 0.1 may therefore be regarded as a threshold. The range of numerical values of circadian stimuli may be 0 to 0.7. A numerical value of circadian stimulus of 0.7 may be associated with a largest possible melatonin suppression of the individual. A numerical value of circadian stimulus of 0.7 may therefore be regarded as saturation. As a non-limiting example, it has been found that exposure to a circadian stimulus of 0.3 or greater at an eye of the individual for, at least, one hour in the early part of the day is effective for stimulating the circadian system and is associated with one or more of better sleep, improved mood, and improved behavior.

The color temperature of the light may be a correlated color temperature. By the wording "correlated color temperature" it is hereby meant the temperature of a hypothetical blackbody radiator emitting light having the same color as the light in question. Depending on the spectral distribution of the light, a specific color temperature of the light may have various circadian stimuli.

The wording "target light profile" should, within the context of this disclosure, be construed as information relating to a preferred light dose or a preferred amount of light that the user should accumulate over time. The preferred light dose/preferred amount of light may be different for different wavelengths. The term "over time" may refer to a time period over which the individual should be exposed to a certain amount of light, such as a day, a week, a month etc. The target light profile may be periodical with a period of 24 hours. The target light profile may comprise information spanning more than 24 hours.

The wording "actual light profile" should, within the context of this disclosure, be construed as information/data associated with an accumulated amount of light that the user has been exposed to. The actual light profile may comprise information about the amount of light and at which wavelength, color temperature and/or circadian stimuli the user has been exposed to.

The determined light setting may be interpreted as specifying properties (e.g., intensity, color temperature, spectrum, etc.) of the light that is actually emitted by the light source.

The target light setting may be interpreted as describing the way the light source should illuminate the individual in order to fulfill the target light profile (i.e., such that the actual light profile and the target light profile are aligned over time). The target light setting may comprise time-resolved data. In other words, the target light setting may specify how the light source should illuminate the individual over time to fulfill the target light profile. The target light setting may be interpreted as the target light profile translated into control settings of the light source.

The light space may be interpreted as a set of possible light settings of the light source. Possible light settings may be light settings that the light source supports in practice. The light space may thus represent a hardware limitation of the light source.

Comparing the target light setting with the light space may be interpreted as determining whether the circadian stimulus of the target light setting is within the range of circadian stimulus of the light space and determining whether the color temperature of the target light setting is within the range of color temperatures of the light space.

By the wording "allowable light setting" it is hereby meant a light setting of the light source which is within the light space and selected with the target light profile in mind. The allowable light setting may be a light setting that are as close as possible to the target light setting while still being within the light space.

A possible associated advantage of the present inventive concept is that if the target light setting is not achievable, the allowable light setting may be determined as a way to find a compromise between the light space and the target light setting. Put differently, the allowable light setting may be a compromise between a desired light setting of the light source and the light settings which the light source actually supports. This allows the circadian rhythm of the individual to be positively stimulated (e.g., in the sense of improved well-being or performance) in more situations. If instead the target light setting is achievable (i.e., within the light space), the target light setting may be directly set as the light setting without the need for any additional computations.

In order to obtain high circadian stimulus, the illuminance of the light can typically be increased, i.e. increasing the brightness of the light. However, increasing brightness typically means an increased power consumption of the light source. The present inventive concept is thus advantageous in that it allows for change in color temperature instead of illuminance, to obtain a different circadian stimulus, even in situations where the adjustment of color temperature may be limited.

The method may further comprise determining an overlap between the range of circadian stimuli and the range of color temperatures of light that the light source can emit, and at least one range of circadian stimuli and at least one range of color temperatures of light that may be allowed by at least one current activity of the individual; and wherein the light space may be the determined overlap.

In other words, the overlap may represent a range of circadian stimuli and a range of color temperatures that both the light source and the current activity allow. Thus, the light space may be possible light settings that both the light source can achieve and that the current activity allows.

By the wording "current activity" it is hereby meant any possible activity of the individual that may put a limitation on how the light can be adjusted. It may for example be a certain task that the individual is performing or how the individual is using the light source. The limitation of the current activity may thus be a non-hardware related limitation.

A possible associated advantage is that the light setting may be determined further based on the current activity of the individual. This may allow for an improved way of determining the light setting, since there may be more than only hardware related limitations on how the light source illuminating the individual can be controlled. It may be improved in the sense that the determined light setting allows the light to be adapted for the target light profile of the individual without disturbing the current activity of the individual. At the same time, it may allow the light to be adjusted for the target light profile even when there are limitations, whereby a better alignment of the target light profile and the actual light profile may be achieved. In other words, despite a current activity, the light setting can be determined such that it may contribute in a positive way towards the individual's well-being.

The method may further comprise: determining a first overlap between the range of circadian stimuli and the range of color temperatures of light that the light source can emit, and a range of circadian stimuli and a range of color temperatures of light allowed by a first current activity of the individual, wherein the first current activity may be associated with a first priority; determining a second overlap between the range of circadian stimuli and the range of color temperatures of light that the light source can emit, and a range of circadian stimuli and a range of color temperatures of light allowed by a second current activity of the individual, wherein the second current activity may be associated with a second priority; wherein the light space may be the first overlap in case the first priority is higher than the second priority, and the second overlap in case the second priority is higher than the first priority.

A possible associated advantage is that in the case two conflicting activities occur at the same time, the light setting can be determined based on the most important activity.

The priority may be seen as a measure of how important the current activity is. More specifically, it may be a measure of how crucial it is that the limitation in light the activity entails is followed.

The act of determining the target light setting may be further based on a range of circadian stimuli and a range of color temperatures of light allowed by a future activity of the individual.

Taking a future limitation into account may allow the target light setting to be determined such that it may compensate for the future limitations of the individual's light exposure beforehand.

The act of determining the allowable light setting may comprise: in case the circadian stimulus of the target light setting is within the range of circadian stimuli of the light space and the color temperature of the target light setting is outside the range of color temperatures the light space:

selecting a color temperature within the range of color temperatures of the light space that fulfills the circadian stimulus of the target light setting, and setting the circadian stimulus of the target light setting and the selected color temperature as the allowable light setting, in case the circadian stimulus of the target light setting is outside the range of circadian stimuli of the light space and the color temperature of the target light setting is within the range of color temperatures of the light space;

selecting a circadian stimulus, within the range of circadian stimuli of the light space, that fulfills the color temperature of the target light setting, and setting the selected circadian stimulus and the color temperature of the target light setting as the allowable light setting, or in case the circadian stimulus of the target light setting is within the range of circadian stimuli of the light space and the color temperature of the target light setting is within the range of color temperature of the light space;

selecting a color temperature within the range of color temperatures of the light space that fulfills the circadian stimulus of the target light setting, and setting the circadian stimulus of the target light setting and the selected color temperature as the allowable light setting, or selecting a circadian stimulus, within the range of circadian stimuli of the light space, that fulfills the color temperature of the target light setting, and setting the selected circadian stimulus and the color temperature of the target light setting as the allowable light setting.

The act of determining the allowable light setting may comprise: selecting a color temperature and a circadian stimulus within the light space which minimizes a difference between the selected color temperature and the color temperature of the target light setting and a difference between the selected circadian stimulus and the circadian stimulus of the target light setting; and setting the selected color temperature and the selected circadian stimulus as the allowable light setting.

A possible associated advantage is that the closest possible light setting to the target light setting can be selected, thereby a difference in light settings may be minimized.

The light source may be an electronic display.

The method may further comprise controlling the light source in accordance with the light setting, such that the actual light profile of the individual may be aligned with the target light profile of the individual over time.

According to a second aspect, a control device for determining a light setting of a light source configured to illuminate an individual is provided, wherein the light setting of the light source comprises information about a circadian stimulus and a color temperature of light emitted by the light source. The control device comprises: circuitry configured to execute: a first determining function configured to determine a target light setting of the light source based on a target light profile of the individual comprising time-resolved information about circadian stimuli and color temperatures of light that the individual is to be exposed to, and an actual light profile of the individual comprising information about circadian stimuli and color temperatures of light the individual has been exposed to, wherein the target light setting comprises information about a circadian stimulus and a color temperature of light to be emitted by the light source and is determined such that the actual light profile and the target light profile are aligned over time; a comparing function configured to compare the target light setting with a light space, wherein the light space may be a range of circadian stimuli and a range of color temperatures of light that the light source can emit; a setting function configured to, in response to the target light setting being within the light space, set the target light setting as the light setting of the light source; and a second determining function configured to, in response to the target light setting being outside the light space, determine an allowable light setting based on the target light setting and the light space, such that the allowable light setting is within the light space; and wherein the setting function may be further configured to, in response to the target light setting being outside the light space, set the allowable light setting as the light setting of the light source.

The circuitry may be further configured to execute a third determining function configured to determine an overlap between the range of circadian stimuli and the range of color temperatures of light that the light source can emit, and at least one range of circadian stimuli and at least one range of color temperatures of light allowed by at least one current activity of the individual; and wherein the light space may be the determined overlap.

The circuitry may be further configured to execute a fourth determining function configured to: determine a first overlap between the range of circadian stimuli and the range of color temperatures of light that the light source can emit, and a range of circadian stimuli and a range of color temperatures of light allowed by a first current activity of the individual, wherein the first current activity may be associated with a first priority; determine a second overlap between the range of circadian stimuli and the range of color temperatures of light that the light source can emit, and a range of circadian stimuli and a range of color temperatures of light allowed by a second current activity of the individual, wherein the second current activity may be associated with a second priority; and wherein the light space may be the first overlap in case the first priority is higher than the second priority, and the second overlap in case the second priority is higher than the first priority.

The first determining function may be further configured to determine the target light setting further based on a range of circadian stimuli and a range of color temperatures of light allowed by a future activity of the individual.

The second determining function may be configured to:

in case the circadian stimulus of the target light setting is within the range of circadian stimuli of the light space and the color temperature of the target light setting is outside the range of color temperatures the light space;

select a color temperature within the range of color temperatures of the light space that fulfills the circadian stimulus of the target light setting, and set the circadian stimulus of the target light setting and the selected color temperature as the allowable light setting, in case the circadian stimulus of the target light setting is outside the range of circadian stimuli of the light space and the color temperature of the target light setting is within the range of color temperatures of the light space;

select a circadian stimulus, within the range of circadian stimuli of the light space, that fulfills the color temperature of the target light setting, and set the selected circadian stimulus and the color temperature of the target light setting as the allowable light setting, or in case the circadian stimulus of the target light setting is within the range of circadian stimuli of the light space and the color temperature of the target light setting is within the range of color temperature of the light space;

select a color temperature within the range of color temperatures of the light space that fulfills the circadian stimulus of the target light setting, and set the circadian stimulus of the target light setting and the selected color temperature as the allowable light setting, or select a circadian stimulus, within the range of circadian stimuli of the light space, that fulfills the color temperature of the target light setting, and set the selected circadian stimulus and the color temperature of the target light setting as the allowable light setting.

The second determining function may be configured to: select a color temperature and a circadian stimulus within the light space which minimizes a difference between the selected color temperature and the color temperature of the target light setting and a difference between the selected circadian stimulus and the circadian stimulus of the target light setting; and set the selected color temperature and the selected circadian stimulus as the allowable light setting.

The light source may be an electronic display.

The circuitry may be further configured to execute a controlling function configured to control the light source in accordance with the light setting, such that the actual light profile of the individual may be aligned with the target light profile of the individual over time.

The above-mentioned features of the first aspect, when applicable, apply to this second aspect as well. In order to avoid undue repetition, reference is made to the above.

According to a third aspect, a non-transitory computer-readable recording medium is provided. The non-transitory computer-readable recording medium having recorded thereon program code portion which, when executed at a device having processing capabilities, performs the method according to the first aspect.

The above-mentioned features of the first and second aspects, when applicable, apply to this third aspect as well. In order to avoid undue repetition, reference is made to the above.

The program may be downloadable to the device having processing capabilities from an application providing service.

According to a fourth aspect, a system for determining a light setting of a light source configured to illuminate an individual is provided, wherein the light setting of the light source may comprise information about a circadian stimulus and a color temperature of light emitted by the light source. The system comprises: a control device according to the second aspect; and a light source communicatively connected to the control device and configured to illuminate the individual according to the light setting such that an accumulated amount of light received by the individual is aligned with the target light profile.

The above-mentioned features of the first, second and third aspects, when applicable, apply to this fourth aspect as well. In order to avoid undue repetition, reference is made to the above.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for the purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a device" or "the device" may include several devices, and the like. Furthermore, the words "comprising", "including", "containing" and similar wordings do not exclude other elements or steps.

BRIEF DESCRIPTION OF THE DRAWINGS

The above and other aspects of the present inventive concept will now be described in more detail, with reference to appended drawings showing variants of the present inventive concept. The figures should not be considered limiting the invention to the specific variant; instead, they are used for explaining and understanding the inventive concept.

As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

A method for determining a light setting of a light source configured to illuminate an individual, as well as a control device and system thereof will now be described with reference to FIG. 1 to FIG. 4D.

Figure 1:
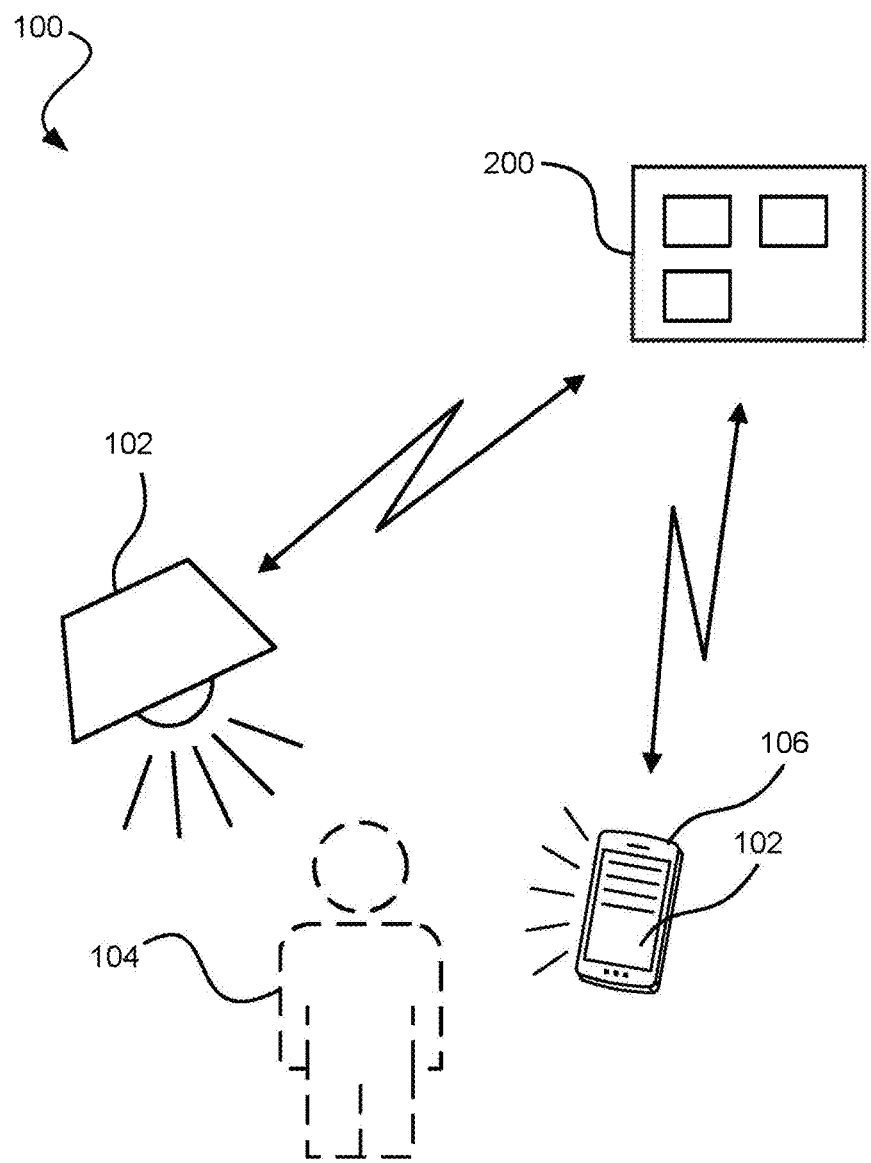
FIG. 1 schematically illustrates a system for determining a light setting of a light source configured to illuminate an individual.

FIG. 1 illustrates a system 100 for determining a light setting of a light source 102 configured to illuminate an individual 104 according to the present inventive concept. The system 100 may be a light control system. An example of such a light control system may be a BioCentric Lighting™ system provided by the applicant. The system 100 comprises a control device 200. The control device 200 is configured to perform the control of the system 100. The control device 200 is further described in connection with FIG. 2.

The system 100 further comprises a light source 102 configured to illuminate the individual. The light source 102 may be any type of electric light source such as a lamp as illustrated herein. The light source 102 may comprise one or more light fixtures such as lamps. The system 100 may further comprise a plurality of light sources configured to illuminate the individual 104. Alternatively, or in combination, the light source 102 may be an electronic display. The electronic display may be a display of an electronic device 106. The electronic device 106 may for example be mobile phones (as illustrated herein), tablets, computer monitors, televisions, smart glasses, or the like. Even though illustrated as separate devices, the light source 102 and the control device 200 may be one and the same device.

The light source 102 is communicatively connected to the control device 200. The light source 102 may be communicatively connected to the control device 200 via a wired and/or a wireless connection. The wired connection may, e.g., be a connection via USB, Ethernet, Firewire, a powerline (using power line communication, PLC), etc. The wireless connection may, e.g., be a connection via Wi-Fi, Li-Fi, NFC, Bluetooth, etc.

The control device 200 is configured to control the light source 102 to illuminate the individual 104 based on a target light profile associated with the individual 104. The light source 102 is controlled according to a light setting such that the illumination of the individual 104 accumulates to an amount of light that is aligned with the target light profile. The target light profile may comprise information about a preferred light dose the individual should be exposed to. Controlling the light source based on the target light profile may thus be interpreted as adjusting the light source such that it emits the light that the individual should be exposed to, thus fulfilling the target light profile. In case the system 100 comprises a plurality of light sources, the control device 200 may be configured to control the plurality of light sources such that the illumination of the individual 104 accumulates to an amount of light that is aligned with the target light profile.

The light setting may be determined by the control device 200.

The individual 104 is herein depicted in dashed lines to illustrate that the individual is not part of the system 100.

Figure 2:
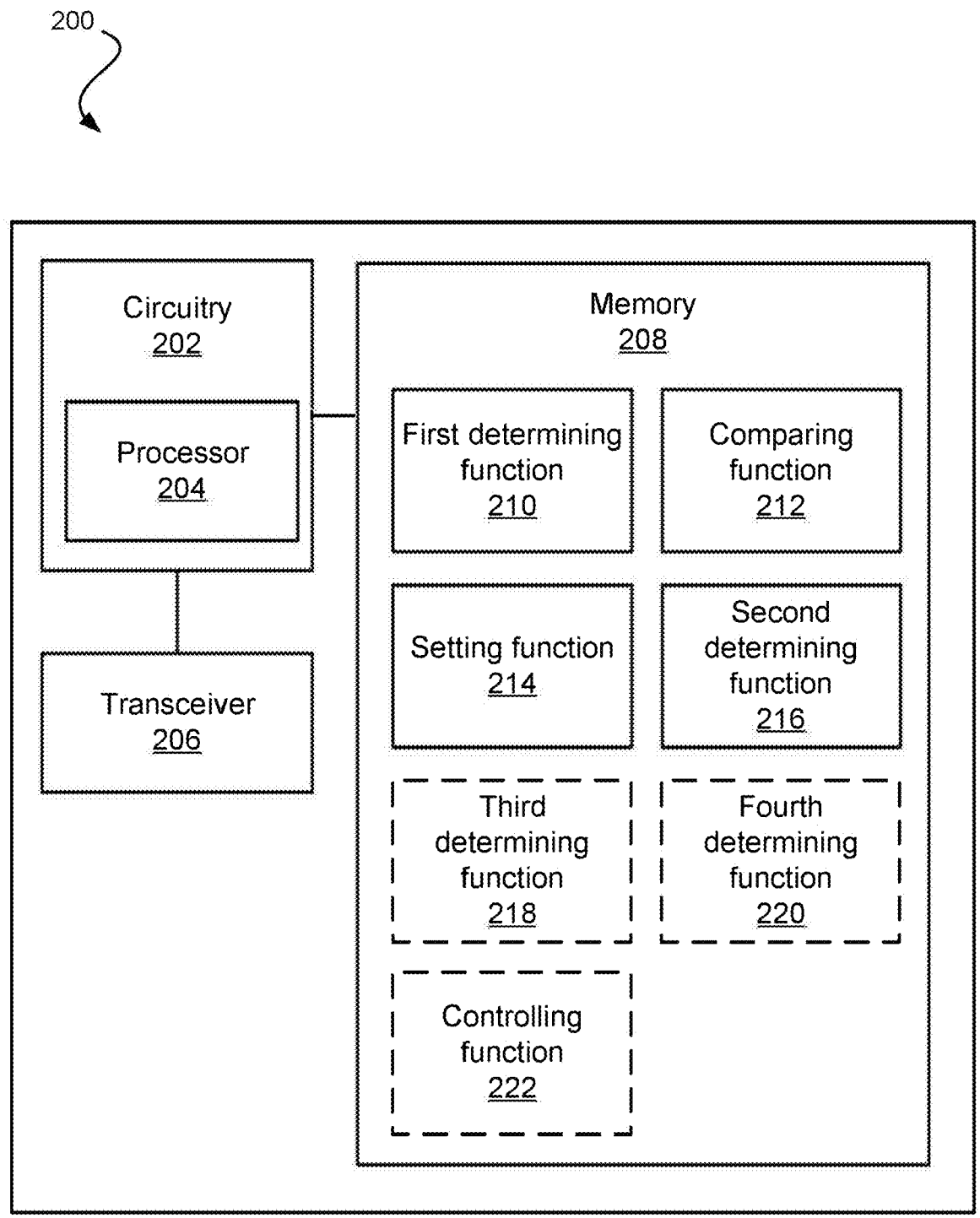
FIG. 2 is a schematic representation of a control device for determining a light setting of a light source configured to illuminate an individual.

FIG. 2 is a schematic illustration of the control device 200 as described in connection with FIG. 1 above.

The control device 200 comprises circuitry 202. The circuitry 202 may physically comprise one single circuitry device. Alternatively, the circuitry 202 may be distributed over several circuitry devices. As shown in the example of FIG. 2, the control device 200 may further comprise a transceiver 206 and a memory 208. The circuitry 202 is communicatively connected to the transceiver 206 and the memory 208. The circuitry 202 may comprise a data bus (not illustrated in FIG. 2), and the circuitry 202 may communicate with the transceiver 206 and/or the memory 208 via the data bus.

The circuitry 202 may be configured to carry out overall control of functions and operations of the control device 200. The circuitry 202 may include a processor 204, such as a central processing unit (CPU), microcontroller, or microprocessor. The processor 204 may be configured to execute program code stored in the memory 208, in order to carry out functions and operations of the control device 200. The circuitry 202 is configured to execute a first determining function 210, a comparing function 212, a setting function 214 and a second determining function 216. The circuitry 202 may further be configured to execute one or more of a third determining function 218, a fourth determining function 220 and a controlling function 222. One or more of the first determining function 210, the second determining function 216, the third determining function 218 and the fourth determining function 220 may be implemented as a single determining function.

The transceiver 206 may be configured to enable the control device 200 to communicate with other devices. The transceiver 206 may both transmit data to and receive data from the control device 200. For example, the control device 200 may collect data about the individual, such as a schedule of a calendar or future planned activities of the individual. This type of information may be collected from e.g. a remote server or a user device of the individual such as a phone of the individual. Further, the user may input information to the control device. Even though not explicitly illustrated in FIG. 2, the control device 200 may comprise input devices such as one or more of a keyboard, a mouse, and a touchscreen. The input from the user may for instance be used in determining the light setting or to obtain information about a current and/or future activity of the individual. Including the input from the user as feedback to the method, the system or control device provides for an even more improved light setting. The control device 200 may communicate with the light source 102 via the transceiver 206.

The memory 208 may be a non-transitory computer-readable storage medium. The memory 208 may comprise one or more of a buffer, a flash memory, a hard drive, a removable media, a volatile memory, a non-volatile memory, a random access memory (RAM), or another suitable device. In a typical arrangement, the memory 208 may include a non-volatile memory for long term data storage and a volatile memory that functions as system memory for the control device 200. The memory 208 may exchange data with the circuitry 202 over the data bus. Accompanying control lines and an address bus between the memory 208 and the circuitry 202 also may be present.

Functions and operations of the control device 200 may be implemented in the form of executable logic routines (e.g., lines of code, software programs, etc.) that are stored on a non-transitory computer readable recording medium (e.g., the memory 208) of the control device 200 and are executed by the circuitry 202 (e.g., using the processor 204). Put differently, when it is stated that the circuitry 202 is configured to execute a specific function, the processor 204 of the circuitry 202 may be configured to execute program code portions stored on the memory 208, wherein the stored program code portions correspond to the specific function. Furthermore, the functions and operations of the circuitry 202 may be a stand-alone software application or form a part of a software application that carries out additional tasks related to the circuitry 202. The described functions and operations may be considered a method that the corresponding device is configured to carry out, such as the method discussed below in connection with FIGS. 3A-3D. Also, while the described functions and operations may be implemented in software, such functionality may as well be carried out via dedicated hardware or firmware, or some combination of one or more of hardware, firmware, and software. The following functions may be stored on the non-transitory computer readable recording medium.

The first determining function 210 is configured to determine a target light setting of the light source based on a target light profile of the individual and an actual light profile of the individual. The target light setting is determined such that the actual light profile and the target light profile are aligned over time when the light source illuminates the individual according to the target light setting. The target light profile comprises time-resolved information about circadian stimuli and color temperatures of light that the individual is to be exposed to. The actual light profile of the individual comprises information about circadian stimuli and color temperatures of light the individual has been exposed to. The target light setting comprises information about a circadian stimulus and a color temperature of light to be emitted by the light source. As an example, based on a comparison between the light that the individual has been exposed to (i.e., according to the actual light profile) and the target light profile it may be concluded that the individual has not been exposed to enough blue light. In this case, the target light setting may be determined such that the individual is exposed to more blue light.

The target light setting may be interpreted as a desirable light setting, as opposed to the light setting to be determined by the method of the present inventive concept, which may be interpreted as the actual light setting that is used to control the light source.

The comparing function 212 is configured to compare the target light setting with a light space. The light space is a range of circadian stimuli and a range of color temperatures of light that the light source can emit. Comparing the target light setting to the light space may comprise determining if the circadian stimulus of the target light setting is within the range of circadian stimuli of the light space and determining if the color temperature of the target light setting is within the range of color temperatures of the light space. In addition, it may be determined how far away the circadian stimulus and/or color temperature of the target light setting is from the corresponding range of the light space.

The setting function 214 is configured to, in response to the target light setting being within the light space, set the target light setting as the light setting of the light source. Put differently, if the target light setting is within the light space, the target light setting may be used as the light setting for the light source.

The second determining function 216 is configured to, in response to the target light setting being outside the light space, determine an allowable light setting based on the target light setting and the light space. The allowable light setting is determined such that it is within the light space. The allowable light setting may be determined such that it is within the light space, and as close as possible to the target light setting. Different ways to determine the allowable light setting will be described below in connection with the description of FIG. 4A-FIG. 4B. In FIG. 4C-FIG. 4D, different ways of determining the light space are described.

The setting function 214 is further configured to, in response to the target light setting being outside the light space, set the allowable light setting as the light setting of the light source.

The third determining function 218 may be configured to determine an overlap between the range of circadian stimuli and the range of color temperatures of light that the light source can emit, and at least one range of circadian stimuli and at least one range of color temperatures of light allowed by at least one current activity of the individual. The light space may be the determined overlap. Put differently, the overlap may be a range of circadian stimuli and a range of color temperatures that are allowed both by the light source and the at least one activity.

The current activity of the individual may be any type of activity that puts a limit on what light can be emitted. For example, the individual may be reading or working. This may require bright light, i.e. high intensity, and light towards the colder spectrum of temperatures. In another example, the individual may be having dinner in the evening and wanting more dimmed lights. This could mean light with warmer color temperatures and lower intensity. It is to be understood that the above activities are examples only, and an activity may require high intensity and warmer color temperatures or low intensity and colder color temperatures.

In the case the light source is an electronic display, the current activity may be related to the content shown on the display, and/or what application is running, since this may put a limitation on how the emitted light from the display can be adjusted. For example, some applications may require a specific color setting, such as video games (which may need a specific dark or light background). Other applications may require as accurate image reproduction as possible (e.g., video or photo editing applications). These types of applications may thus put a limitation on how the light emitted from the display can be adjusted. The current activity may be determined by obtaining, by the control device 200, information about what application is running on the device associated with the electronic display. The range of circadian stimuli and the range of color temperatures allowed by a certain application (i.e., a light space of the application) may be pre-determined and stored in the control device 200 (e.g., in a database stored on the memory 208).

The fourth determining function 220 may be configured to determine a first overlap between the range of circadian stimuli and the range of color temperatures of light that the light source can emit, and a range of circadian stimuli and a range of color temperatures of light allowed by a first current activity of the individual, wherein the first current activity may be associated with a first priority. The fourth determining function 220 may be further configured to determine a second overlap between the range of circadian stimuli and the range of color temperatures of light that the light source can emit, and a range of circadian stimuli and a range of color temperatures of light allowed by a second current activity of the individual, wherein the second current activity may be associated with a second priority. The light space may be the first overlap in case the first priority is higher than the second priority, and the second overlap in case the second priority is higher than the first priority. Determining which priority is higher than the other may be performed by the fourth determining function 220. Examples of how the overlap can be determined are given in connection with FIGS. 4A-D. The priority associated with a certain activity may be dependent on a time-of-day that the activity is performed at.

The first determining function 210 may be further configured to determine the target light setting further based on a range of circadian stimuli and a range of color temperatures of light allowed by a future activity of the individual. The range of circadian stimuli and the range of color temperatures of light allowed by a future activity may be a light space of the future activity. The future activity may be a planned activity. Information of such future activity may be retrieved from a calendar associated with the individual. The future activity may be predicted based on typical behavior patterns of the individual. For example, in case the individual typically watches TV between specific times in the evening, the act of watching TV may be a predicted future activity of the individual between the specific times.

It is to be understood that artificial intelligence (AI) and/or machine learning may be used for predicting future activities. When determining the target light setting based on a future activity of the individual, the target light setting may be determined such that it compensates for the future limitation in light adjustment beforehand. For instance, if the future activity requires light which also provides a high stimulation to the individual later in the day, the target light setting may adapt so that it understimulates the individual prior to the planned activity. In other words, the light setting is determined such that it compensates for that the actual light profile and the target light profile will align later in the day. If instead the future activity requires light which provides a low stimulation of the individual, e.g. low circadian stimulus, the target light setting may adapt so that it overstimulates the individual prior to the planned activity. In other words, the light setting is determined such that the actual light profile is closer to being aligned with the target light profile earlier in the day than if the future activity would not have taken place.

The second determining function 216 may be configured to, in case the circadian stimulus of the target light setting is within the range of circadian stimuli of the light space and the color temperature of the target light setting is outside the range of color temperatures the light space: select a color temperature within the range of color temperatures of the light space that fulfills the circadian stimulus of the target light setting, and set the circadian stimulus of the target light setting and the selected color temperature as the allowable light setting. In case the color temperature of the target light setting is outside the range of color temperatures of the light space, a color temperature within the range of color temperatures of the light space may be selected such that a difference between the selected color temperature and the color temperature of the target light setting is minimized. The selected color temperature may be one of a set of color temperatures within the range of color temperatures of the light space which fulfills the circadian stimulus of the target light setting. How the ranges of circadian stimuli and the ranges of color temperatures may relate to each other is further described in connection with FIGS. 4A-D.

The second determining function 216 may be configured to, in case the circadian stimulus of the target light setting is outside the range of circadian stimuli of the light space and the color temperature of the target light setting is within the range of color temperatures of the light space: select a circadian stimulus, within the range of circadian stimuli of the light space, that fulfills the color temperature of the target light setting, and set the selected circadian stimulus and the color temperature of the target light setting as the allowable light setting. In case the circadian stimulus of the target light setting is outside the range of circadian stimuli of the light space, a circadian stimulus within the range of circadian stimuli of the light space may be selected such that a difference between the selected circadian stimulus and the circadian stimulus of the target light setting is minimized. The selected circadian stimulus may be one of a set of circadian stimuli within the range of circadian stimuli of the light space which fulfills the color temperature of the target light setting.

The second determining function 216 may be configured to, in case the circadian stimulus of the target light setting is within the range of circadian stimuli of the light space and the color temperature of the target light setting is within the range of color temperature of the light space: select a color temperature within the range of color temperatures of the light space that fulfills the circadian stimulus of the target light setting, and set the circadian stimulus of the target light setting and the selected color temperature as the allowable light setting. Alternatively, the second determining function 216 may be configured to select a circadian stimulus, within the range of circadian stimuli of the light space, that fulfills the color temperature of the target light setting and set the selected circadian stimulus and the color temperature of the target light setting as the allowable light setting. In this case where the target light setting (i.e. the combination of the circadian stimulus and the color temperature of the target light setting) is outside the light space, while the circadian stimulus of the target light setting on its own is within the range of circadian stimuli of the light space and the color temperature of the target light setting on its own is within the range of color temperature of the light space, either the circadian stimulus or the color temperature of the target light setting may be set as the circadian stimulus or the color temperature of the target light setting, respectively. In such case, the other one of the circadian stimulus and the color temperature may be selected from the range of circadian stimuli or color temperatures of the light space. The other one of the circadian stimulus and the color temperature may be selected such that a difference between the selected circadian stimulus or color temperature and circadian stimulus or color temperature of the target light setting is minimized.

The second determining function 216 may be configured to select a color temperature and a circadian stimulus within the light space which minimizes a difference between the selected color temperature and the color temperature of the target light setting and a difference between the selected circadian stimulus and the circadian stimulus of the target light setting; and set the selected color temperature and the selected circadian stimulus as the allowable light setting.

The controlling function 222 may be configured to control the light source in accordance with the light setting, such that the actual light profile of the individual is aligned with the target light profile of the individual over time. The control device 200 may be configured to determine the actual light profile, i.e. the accumulated amount of light received by the individual. For instance, the control device 200 may communicate with a light sensor configured to determine and/or estimate a light exposure of the individual. The light sensor may be worn by the individual. The light sensor may be arranged at a position which the light source is configured to illuminate. Alternatively, or additionally, the light source may be configured to communicate a current light output to the control device 200, and the circuitry 202 may be configured to determine and/or estimate the accumulated amount of light received by the individual by accumulating the current light output over time. Alternatively, or additionally, the control device 200 may be configured to determine and/or estimate a current light output from the light source from the light setting sent from the circuitry 202 to the light source, and the circuitry 202 may be configured to determine and/or estimate the accumulated amount of light received by the individual by accumulating the current light output over time.

Figure 3A:
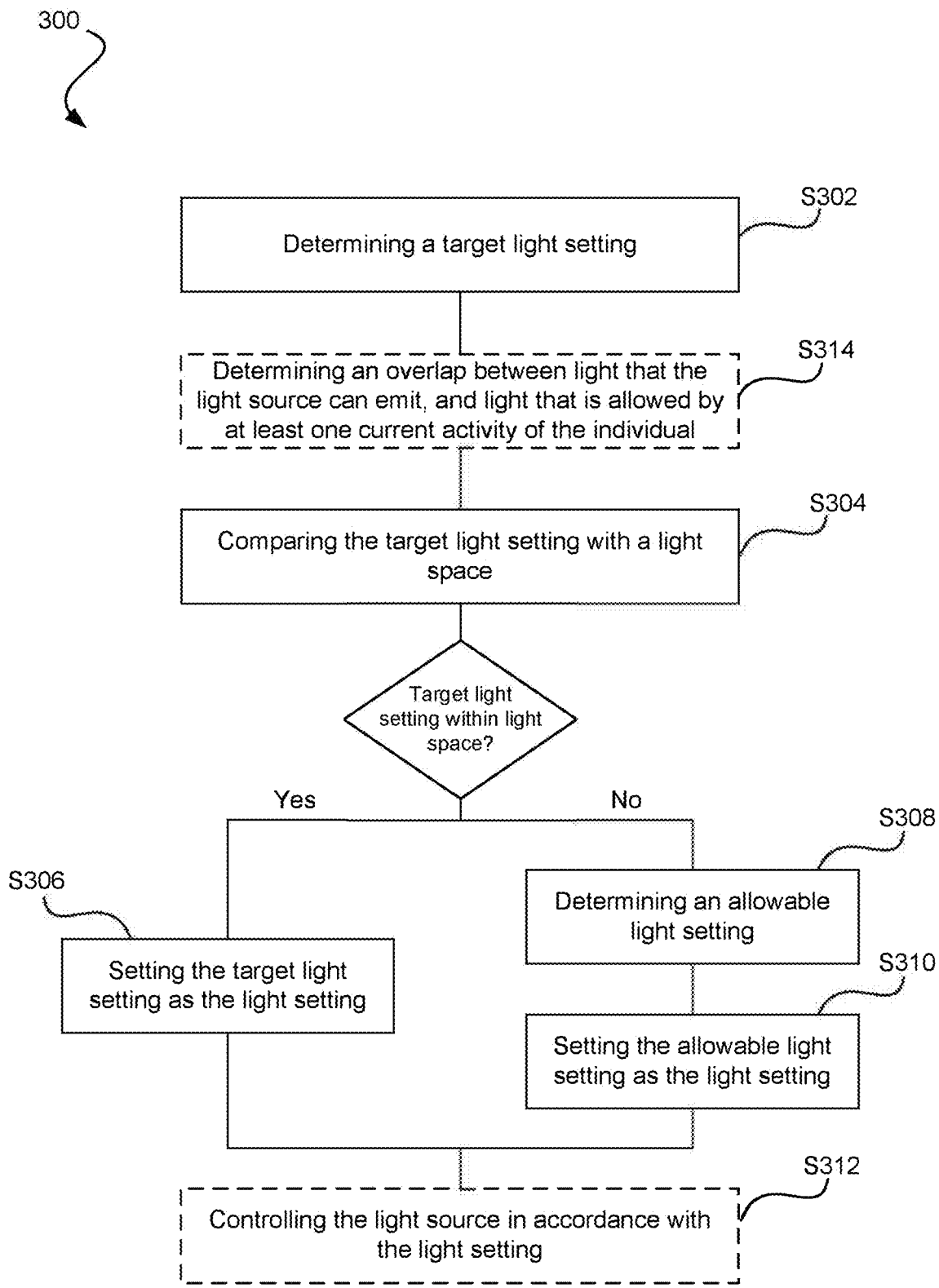
FIG. 3A-3D are flow charts illustrating the steps of a method for determining a light setting of a light source configured to illuminate an individual.
Figure 3B:
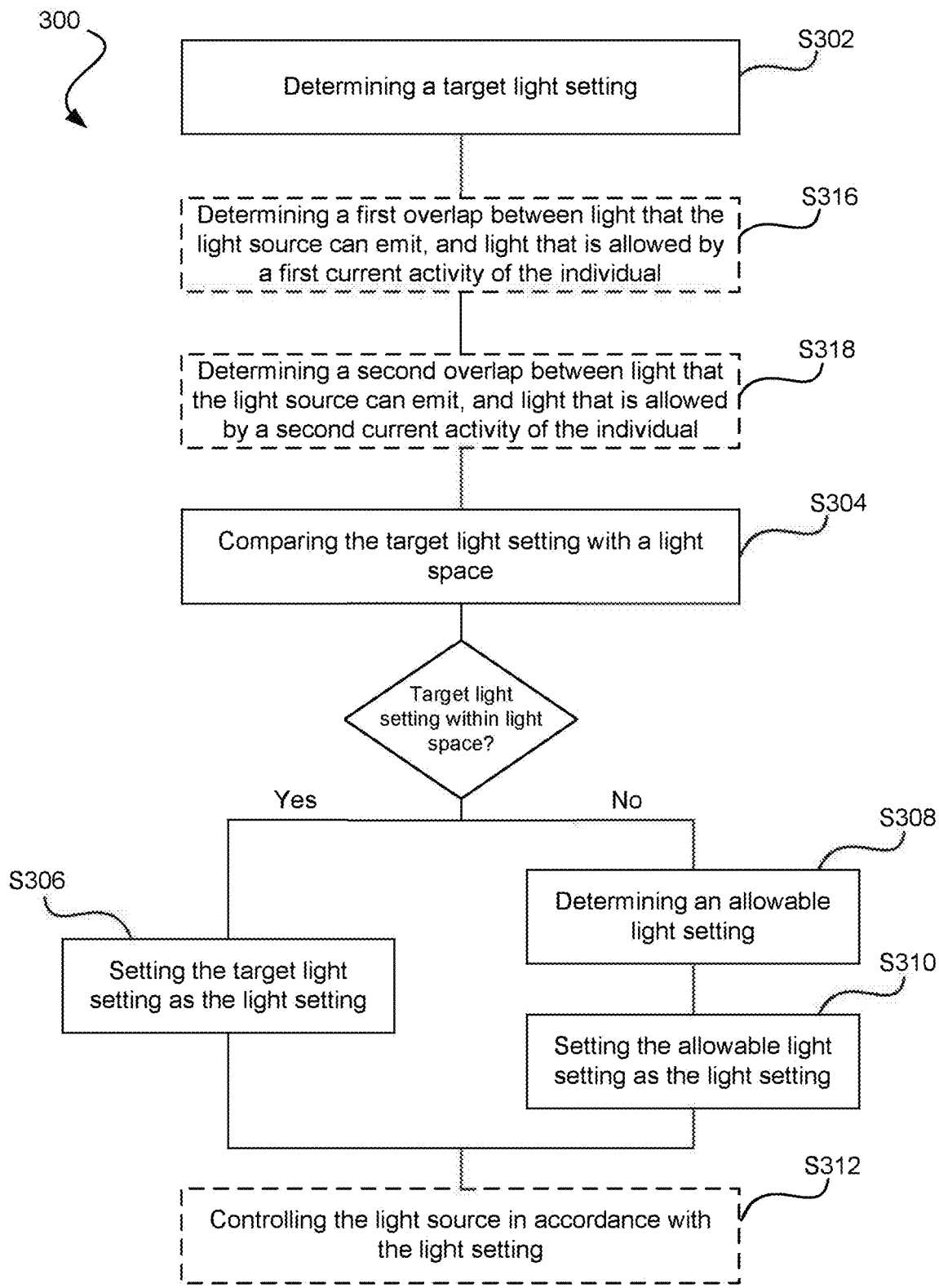
Figure 3C:
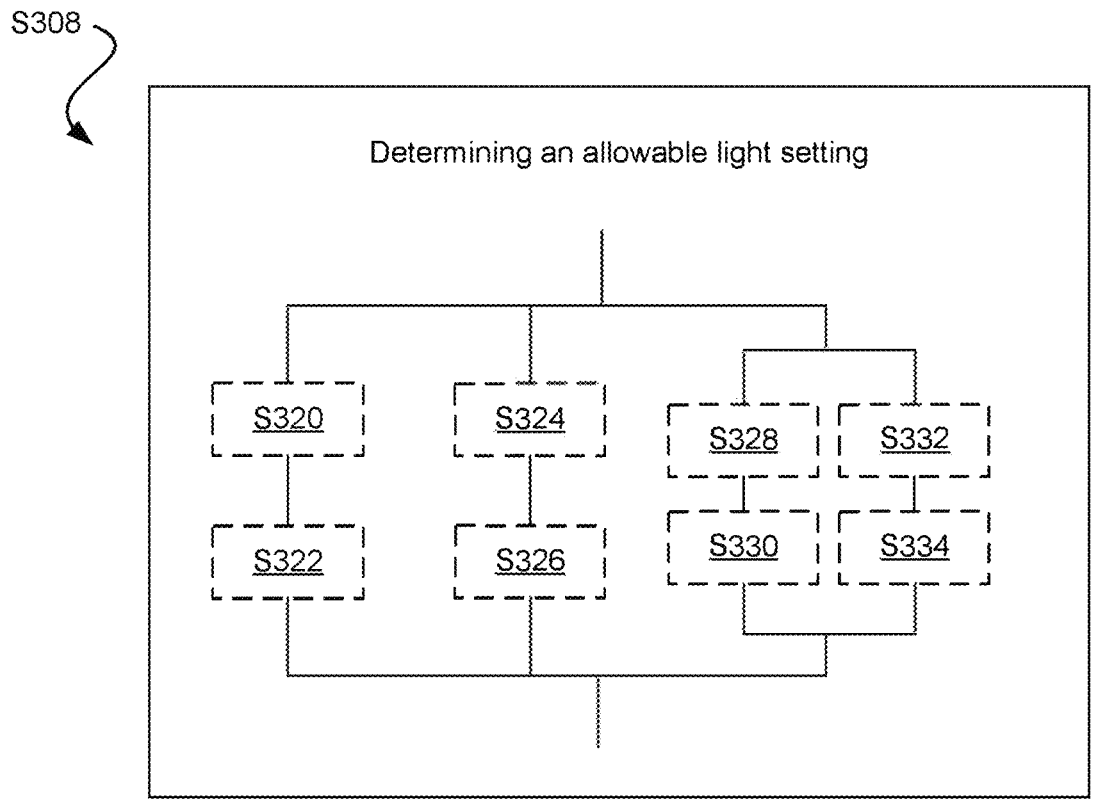

FIGS. 3A-3D are flow charts illustrating the steps of the method 300 for determining a light setting of a light source configured to illuminate an individual, wherein the light setting of the light source comprises information about a circadian stimulus and a color temperature of light emitted by the light source. More specifically, FIG. 3A and FIG. 3B illustrate the method 300 with different optional steps. FIG.

Figure 3D:
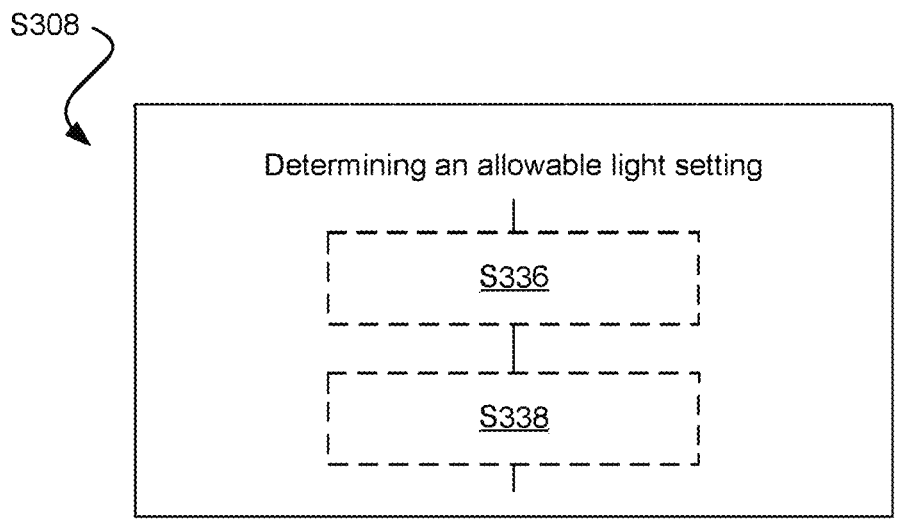

3C and FIG. 3D illustrate different optional sub-steps to an act of determining an allowable light setting S308 as further described below.

Below, the different steps are described in more detail. Even though illustrated in a specific order, the steps of the method 300 may be performed in any suitable order, in parallel, as well as multiple times.

A target light setting of the light source is determined S302 based on a target light profile of the individual and an actual light profile of the individual. The target light profile may comprise time-resolved information about circadian stimuli and color temperatures of light that the individual is to be exposed to. The actual light profile of the individual may comprise information about circadian stimuli and color temperatures of light the individual has been exposed to. The target light setting may comprise information about a circadian stimulus and a color temperature of light to be emitted by the light source. The target light setting is determined such that the actual light profile and the target light profile are aligned over time.

The light source may be an electronic display.

The target light setting is compared S304 with a light space. The light space may be a range of circadian stimuli and a range of color temperatures of light that the light source can emit.

In response to the target light setting being within the light space, the target light setting is set S306 as the light setting of the light source.

In response to the target light setting being outside the light space, an allowable light setting is determined S308 based on the target light setting and the light space, such that the allowable light setting is within the light space, and the allowable light setting is set S310 as the light setting of the light source.

An overlap between the range of circadian stimuli and the range of color temperatures of light that the light source can emit, and at least one range of circadian stimuli and at least one range of color temperatures of light that is allowed by at least one current activity of the individual may be determined S314. The light space may be the determined overlap.

A first overlap between the range of circadian stimuli and the range of color temperatures of light that the light source can emit, and a range of circadian stimuli and a range of color temperatures of light allowed by a first current activity of the individual may be determined S316. The first current activity may be associated with a first priority. A second overlap between the range of circadian stimuli and the range of color temperatures of light that the light source can emit, and a range of circadian stimuli and a range of color temperatures of light allowed by a second current activity of the individual may be determined S318. The second current activity may be associated with a second priority. The light space may be the first overlap in case the first priority is higher than the second priority, and the second overlap in case the second priority is higher than the first priority.

Determining the target light setting S302 may be further based on a range of circadian stimuli and a range of color temperatures of light allowed by a future activity of the individual.

Determining the allowable light setting S308 may, in case the circadian stimulus of the target light setting is within the range of circadian stimuli of the light space and the color temperature of the target light setting is outside the range of color temperatures the light space, comprise: selecting S320 a color temperature within the range of color temperatures of the light space that fulfills the circadian stimulus of the target light setting, and setting S322 the circadian stimulus of the target light setting and the selected color temperature as the allowable light setting.

Determining the allowable light setting S308 may, in case the circadian stimulus of the target light setting is outside the range of circadian stimuli of the light space and the color temperature of the target light setting is within the range of color temperatures of the light space, comprise: selecting S324 a circadian stimulus, within the range of circadian stimuli of the light space, that fulfills the color temperature of the target light setting, and setting S326 the selected circadian stimulus and the color temperature of the target light setting as the allowable light setting.

Determining the allowable light setting S308 may, in case the circadian stimulus of the target light setting is within the range of circadian stimuli of the light space and the color temperature of the target light setting is within the range of color temperature of the light space, comprise: selecting S328 a color temperature within the range of color temperatures of the light space that fulfills the circadian stimulus of the target light setting, and setting S330 the circadian stimulus of the target light setting and the selected color temperature as the allowable light setting, or selecting S332 a circadian stimulus, within the range of circadian stimuli of the light space, that fulfills the color temperature of the target light setting, and setting S334 the selected circadian stimulus and the color temperature of the target light setting as the allowable light setting.

Determining the allowable light setting S308 may comprise: selecting S336 a color temperature and a circadian stimulus within the light space which minimizes a difference between the selected color temperature and the color temperature of the target light setting and a difference between the selected circadian stimulus and the circadian stimulus of the target light setting; and setting S338 the selected color temperature and the selected circadian stimulus as the allowable light setting.

The light source may be controlled S312 in accordance with the light setting, such that the actual light profile of the individual is aligned with the target light profile of the individual over time.

FIGS. 4A to 4D illustrate, among other things, different examples of light spaces and how the allowable light setting may be determined in different cases. These examples should be seen as illustrative examples for improved understanding. The present inventive concept is not limited to these examples, as is readily understood by the skilled person. In FIGS. 4A to 4D, the light intensity, i.e. illuminance, is assumed to be constant.

Figure 4A:
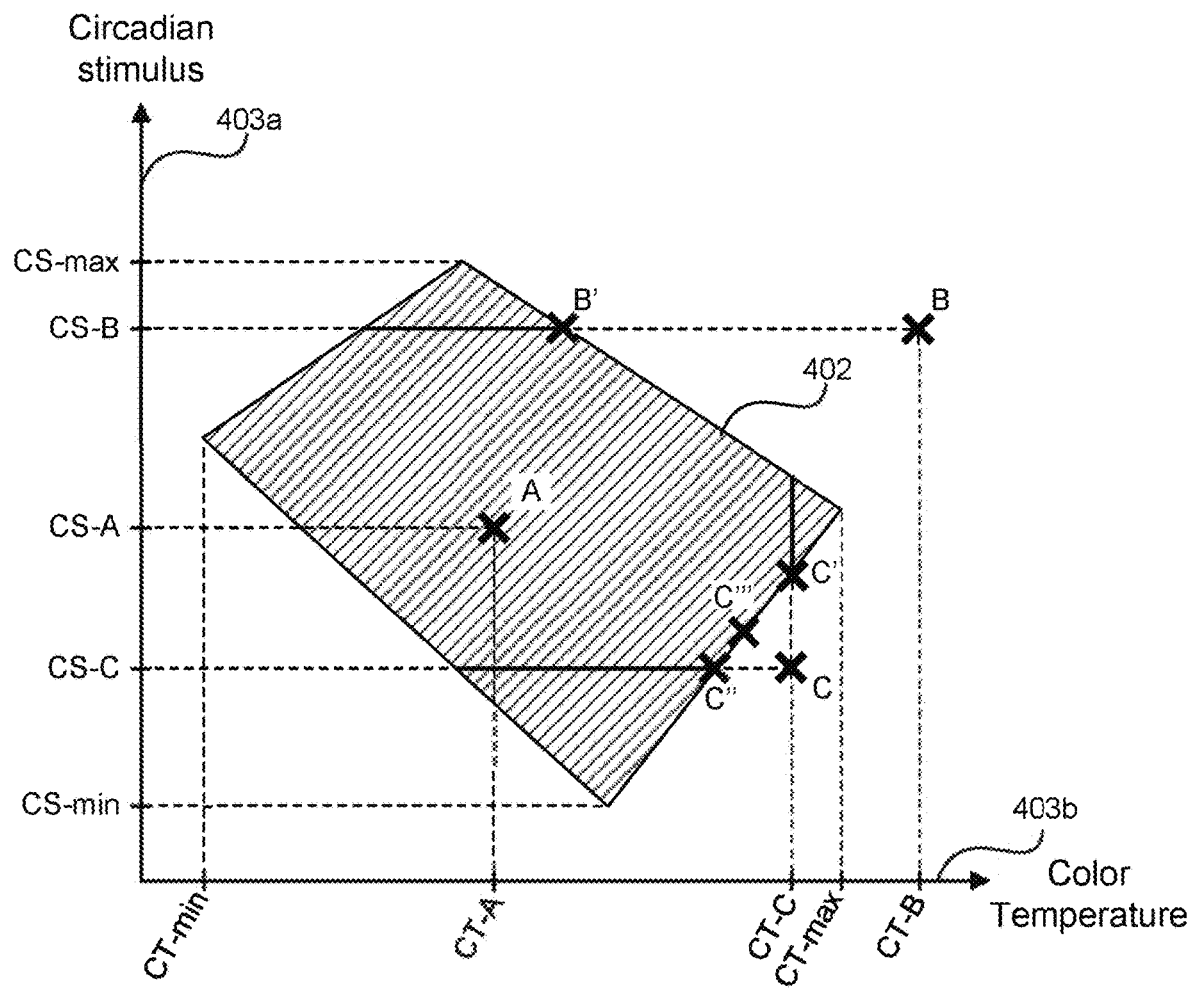
FIG. 4A-D shows different examples of light spaces for illustrating the relationship between circadian stimulus and color temperature described in connection with FIGS. 1 to 3.

FIG. 4A illustrates an example of a first light space 402. The light space 402 is represented by a two-dimensional section in a graph showing increasing values of circadian stimulus along a first axis 403a and increasing values of color temperature along a second axis 403b.

As described above, the light space 402 may be a range of color temperatures and a range of circadian stimuli that the light source can emit. The circadian stimuli and the color temperatures may be dependent on each other. For each value of circadian stimuli, a set of color temperatures may be possible. Correspondingly, for each value of color temperature, a set of circadian stimuli may be possible. As is well known in the art, visible light (e.g., white light) may comprise light of multiple wavelengths. A difference between light of the set of color temperatures for a certain circadian stimulus (or light of the set of circadian stimuli for a certain color temperature) may be what wavelengths of light it comprises. As an example, light with a certain color temperature may have a first circadian stimulus or a second circadian stimulus. The light having the certain color temperature and the first circadian stimulus may comprise a first set of wavelengths while light having the certain color temperature and the second circadian stimulus may comprise of a second set of wavelengths.

In the example of FIG. 4A, the light space 402 is illustrated in the shape of a quadrilateral. It should be noted that this is merely a non-limiting example. The light space 402 may take other shapes as well, within the circadian stimulus and color temperature domain.

As a first example, a first target light setting A is shown, marked by a cross. The first target light setting specifies a circadian stimulus of CS-A and a color temperature of CT-A. This example represents a case where the target light setting is within the light space 402, i.e. both the circadian stimulus CS-A and the color temperature CT-A are within the respective range of the light space 402. In this case, the target light setting can be set as the light setting of the light source.

As a second example, a second target light setting B is shown. This represents a case where the target light setting is outside the light space 402. Put differently, the light source does not support the second target light setting B, and the light setting of the light source cannot be set to the second target light setting B. Thus, an allowable light setting is to be determined. In this second example, the circadian stimulus CS-B of the second target light setting B is within the range of circadian stimuli of the light space 402. In other words, the circadian stimulus CS-B of the second target light setting B is lower than a maximum circadian stimulus CS-max of the light space 402 and higher than a minimum circadian stimulus CS-min of the light space 402. Thus, the circadian stimulus CS-B could be fulfilled. However, the color temperature CT-B of the second target light setting B is outside the range of color temperatures of the light space 402. In this case, the color temperature CT-B of the second target light setting B is higher than a maximum color temperature CT-max of the light space. Alternatively, it may be outside in the sense of being lower than a minimum color temperature CT-min of the light space 402. The allowable light setting in this case may be determined as the cross indicated by B'. In this example, the circadian stimulus of the allowable light setting is the same as the target light setting, i.e. CS-B. The color temperature of the allowable light setting may be chosen as any of the color temperatures within the light space 402 which fulfils the circadian stimulus CS-B, i.e. any color temperature along the solid line along the level of CS-B. It may however be preferred that, as in this case, the color temperature which fulfills the circadian stimulus CS-B, and which is the closest possible to the target light setting is selected. Alternatively, the allowed light setting may be chosen as the light setting, which is closest to the target light setting, but still within the light space. In other words, the allowable light setting may be chosen as the light setting which minimized the Euclidian distance between the light space and the target light setting.

As a third example, a third target light setting C is shown. Both the color temperature and circadian stimulus of the third target light setting C are within their respective ranges of the light space 402. However, the third target light setting C is still outside of the light space 402, which means that the combination of the circadian stimulus CS-C and the color temperature CT-C of the third target light setting C is not allowed by the light space 402.

Referring to the third example, the allowable light setting may be determined as the light setting C'. This would correspond to selecting a circadian stimulus which fulfills the color temperature CT-C of the third target light setting C. Any light setting on the solid line along the color temperature CT-C may be chosen, but preferably the circadian stimulus that is closest to the circadian stimulus CS-C of the third target light setting C.

Referring again to the third example, the allowable light setting may be determined as the light setting C". This would correspond to selecting a color temperature which fulfills the circadian stimulus CS-C of the third target light setting C. Any light setting on the solid line along the circadian stimulus CS-C may be chosen, but preferably the color temperature that is closest to the color temperature CT-C of the third target light setting C.

Referring again to the third example, the allowable light setting may be determined as the light setting C'''. This would correspond to selecting a light setting (i.e., a color temperature and a circadian stimulus) within the light space 402 which minimizes a difference between the selected color temperature and the color temperature CT-C of the third target light setting C and a difference between the selected circadian stimulus and the circadian stimulus CS-C of the third target light setting C. In other words, the light setting C''' would correspond to the light setting within the light space 402 that is the closest to the third target light setting C.

Figure 4B:
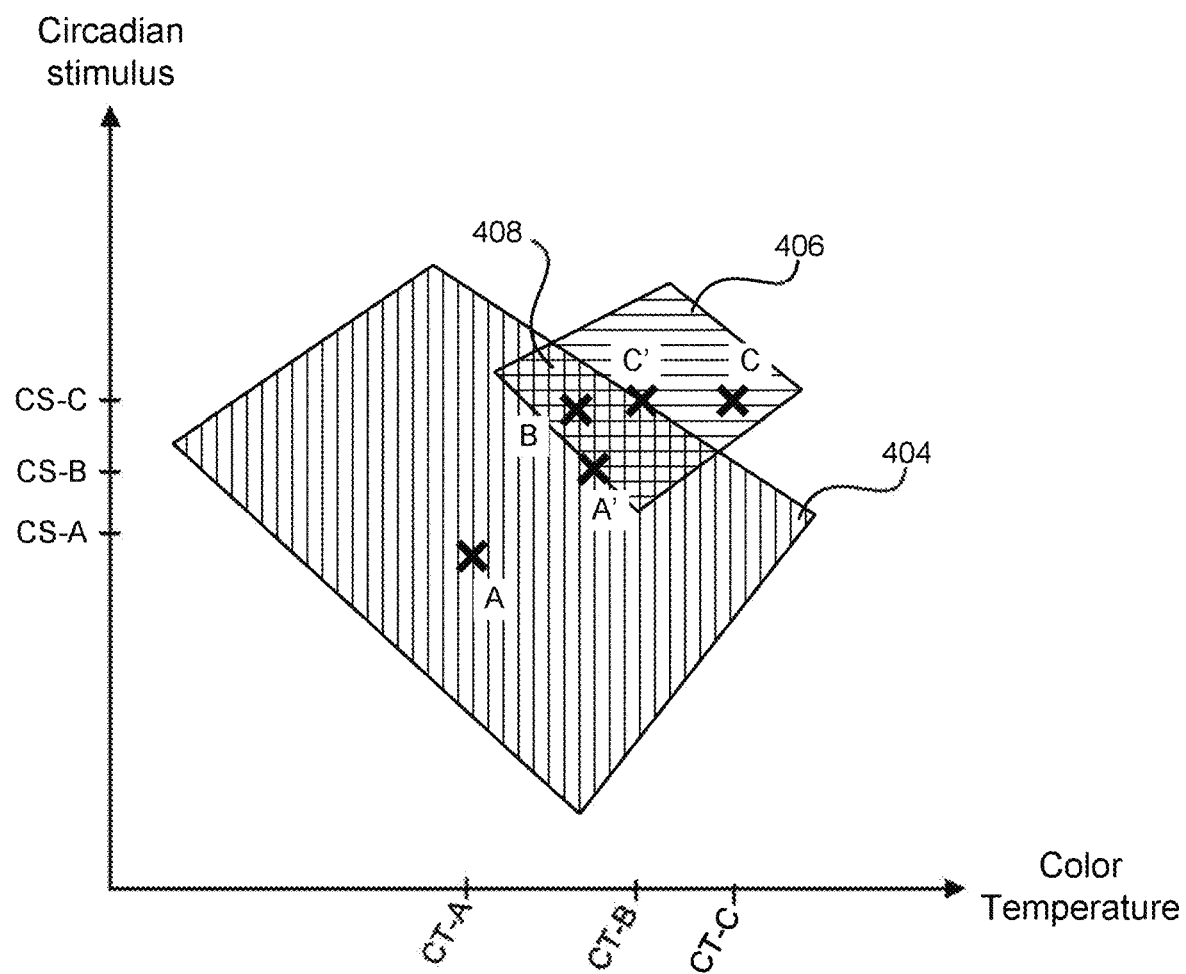
Figure 4C:
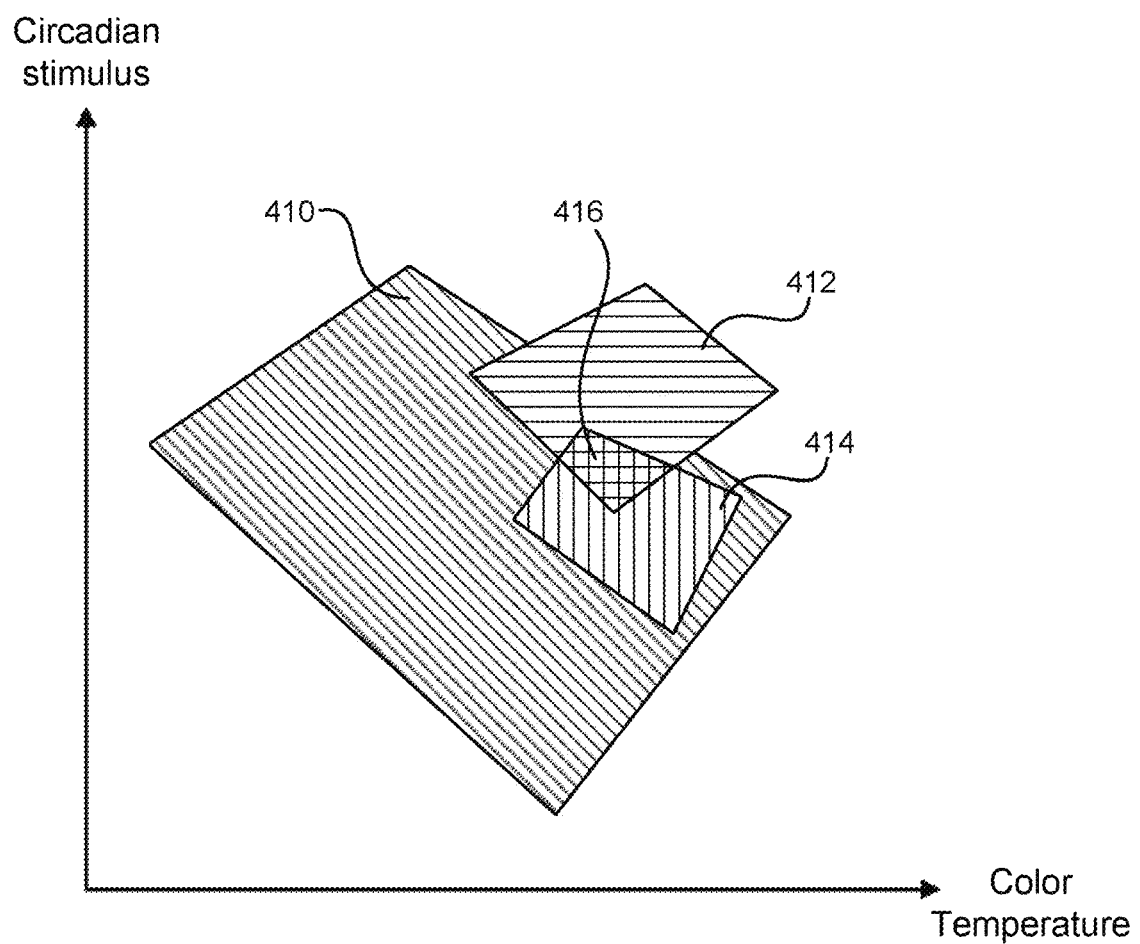
Figure 4D:
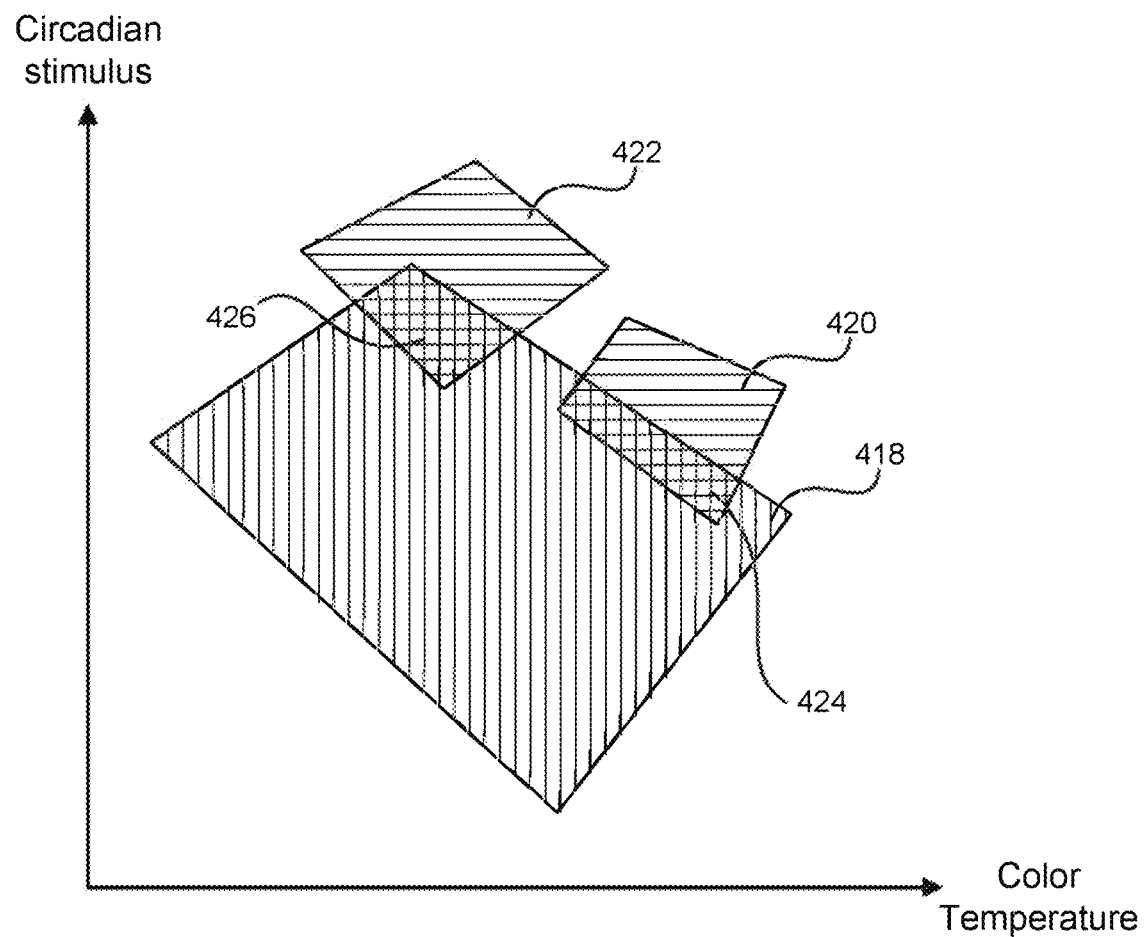

FIG. 4B illustrates, by way of example, how the light space may be determined. A first light space 404 is shown. The first light space 404 may represent a range of circadian stimuli and a range of color temperatures that a light source can emit. A second light space 406 is further shown. The second light space 406 may represent a range of circadian stimuli and a range of color temperatures that a current activity of an individual allows. A third light space 408 may be determined as an overlap between the first light space 404 and the second light space 406. The third light space 408 may thus represent a range of circadian stimuli and a range of color temperatures that both the light source and the current activity allows. The third light space 408 may then be used as the light space which the target light setting is compared to.

Referring to the example of FIG. 4B, the exemplifying target light setting A would be within the first light space 404, but not the third light space 408. An allowable light setting, for example A' (the light setting within the third light space 408 which is closest to the target light setting A), would then be determined. The exemplifying target light setting B would be within the third light space 408, and thus the light setting may be set as the target light setting B. The exemplifying target light setting C would be outside of the third light space 408 (even though within the second light space 406). An allowable light setting, for example C' (corresponding to the same circadian stimulus as the target light setting C and the closest color temperature to the color temperature of the target light setting C), would then be calculated.

It is to be understood that the ways to determine the allowable light setting as described in connection with the light space 402 of FIG. 4A may be applied for the third light space 408 of FIG. 4B.

FIG. 4C illustrates, by way of example, how the light space may be determined. In this case, a fourth light space 410 representing the light settings allowed by the light source is shown. In addition, a fifth and sixth light space 412, 414 representing allowed light settings of a respective first and second current activity are shown. A seventh light space 416 may be determined as an overlap between the fourth, fifth and sixth light spaces 410, 412, 414 and be selected as the light space which the target light setting is compared to. In general, any number of current activities may be used to limit the light space.

It is to be understood that the ways to determine the allowable light setting as described in connection with the light space 402 of FIG. 4A and in connection with the third light space 408 of FIG. 4B may be applied for the seventh light space 416 of FIG. 4C.

FIG. 4D illustrates, by way of example, a case where a range of circadian stimuli and color temperatures of a first current activity and a range of circadian stimuli and color temperatures of a second current activity do not overlap. As in the previous examples, an eighth light space 418 is shown. The eighth light space 418 may represent the range of circadian stimuli and the range of color temperatures that the light source can emit. A ninth light space 420 represents the range of circadian stimuli and the range of color temperature that the first current activity allows. The ninth light space 420 creates a first overlap 424 with the eighth light space 418. A tenth light space 422 represents the range of circadian stimuli and the range of color temperature that the second current activity allows. The tenth light space 422 creates a second overlap 426 with the eighth light space 418. The first and second current activity may be associated with a respective first and second priority. The light space that is used to compare the target light setting against, may be chosen as the first overlap 424 if the first priority is higher than the second priority. An allowable light setting, within the first overlap 424, may thus be 30 determined, if the target light setting is outside the first overlap 424. Alternatively, the light space may be chosen as the second overlap 426 if the second priority is higher than the first priority. An allowable light setting, within the first overlap 424, may thus be determined, if the target light setting is outside the first overlap 424.

It is to be understood that the ways to determine the allowable light setting as described in connection with the light space 402 of FIG. 4A and in connection with the third light space 408 of FIG. 4B may be applied for the first and second overlaps 424, 426 of FIG. 4D. Additionally, variations to the disclosed variants can be understood and effected by the skilled person in practicing the claimed invention, from a study of the drawings, the disclosure, and the appended claims.

The invention claimed is:

1. A computer implemented method for determining a light setting of a light source configured to illuminate an individual, wherein the light setting of the light source comprises information about a circadian stimulus and a color temperature of light emitted by the light source, wherein the circadian stimulus is a numerical value proportional to a degree of melatonin suppression of an individual after a time period of light exposure, the method comprising:
determining a target light setting of the light source based on a target light profile of the individual comprising time-resolved information about circadian stimuli and color temperatures of light that the individual is to be exposed to, and an actual light profile of the individual comprising information about circadian stimuli and color temperatures of light the individual has been exposed to, wherein the target light setting comprises information about a circadian stimulus and a color temperature of light to be emitted by the light source and is determined such that the actual light profile and the target light profile are aligned over time;

comparing the target light setting with a light space, wherein the light space is a range of circadian stimuli and a range of color temperatures of light that the light source can emit;
in response to the target light setting being within the light space:
setting the target light setting as the light setting of the light source; and
in response to the target light setting being outside the light space:
determining an allowable light setting based on the target light setting and the light space, such that the allowable light setting is within the light space, and setting the allowable light setting as the light setting of the light source.

2. The method according to claim 1, further comprising:
determining an overlap between the range of circadian stimuli and the range of color temperatures of light that the light source can emit, and at least one range of circadian stimuli and at least one range of color temperatures of light allowed by at least one current activity of the individual; and
wherein the light space is the determined overlap.

3. The method according to claim 1, further comprising:
determining a first overlap between the range of circadian stimuli and the range of color temperatures of light that the light source can emit, and a range of circadian stimuli and a range of color temperatures of light allowed by a first current activity of the individual, wherein the first current activity is associated with a first priority;
determining a second overlap between the range of circadian stimuli and the range of color temperatures of light that the light source can emit, and a range of circadian stimuli and a range of color temperatures of light allowed by a second current activity of the individual, wherein the second current activity is associated with a second priority;
wherein the light space is the first overlap in case the first priority is higher than the second priority, and the second overlap in case the second priority is higher than the first priority.

4. The method according to claim 1, wherein the act of determining the target light setting is further based on a range of circadian stimuli and a range of color temperatures of light allowed by a future activity of the individual.

5. The method according to claim 1, wherein the act of determining the allowable light setting comprises:
in case the circadian stimulus of the target light setting is within the range of circadian stimuli of the light space and the color temperature of the target light setting is outside the range of color temperatures the light space:
selecting a color temperature within the range of color temperatures of the light space that fulfills the circadian stimulus of the target light setting, and
setting the circadian stimulus of the target light setting and the selected color temperature as the allowable light setting,
in case the circadian stimulus of the target light setting is outside the range of circadian stimuli of the light space and the color temperature of the target light setting is within the range of color temperatures of the light space:
selecting a circadian stimulus, within the range of circadian stimuli of the light space, that fulfills the color temperature of the target light setting, and setting the selected circadian stimulus and the color temperature of the target light setting as the allowable light setting, or in case the circadian stimulus of the target light setting is within the range of circadian stimuli of the light space and the color temperature of the target light setting is within the range of color temperature of the light space:
selecting a color temperature within the range of color temperatures of the light space that fulfills the circadian stimulus of the target light setting, and
setting the circadian stimulus of the target light setting and the selected color temperature as the allowable light setting, or
selecting a circadian stimulus, within the range of circadian stimuli of the light space, that fulfills the color temperature of the target light setting, and setting the selected circadian stimulus and the color temperature of the target light setting as the allowable light setting.

6. The method according to claim 1, wherein the act of determining the allowable light setting comprises:
selecting a color temperature and a circadian stimulus within the light space which minimizes a difference between the selected color temperature and the color temperature of the target light setting and a difference between the selected circadian stimulus and the circadian stimulus of the target light setting; and
setting the selected color temperature and the selected circadian stimulus as the allowable light setting.

7. The method according to claim 1, further comprising controlling the light source in accordance with the light setting, such that the actual light profile of the individual is aligned with the target light profile of the individual over time.

8. A non-transitory computer-readable recording medium having recorded thereon program code portion which, when executed at a device having processing capabilities, performs the method according to claim 1.

9. A control device for determining a light setting of a light source configured to illuminate an individual, wherein the light setting of the light source comprises information about a circadian stimulus and a color temperature of light emitted by the light source, wherein the circadian stimulus is a numerical value proportional to a degree of melatonin suppression of an individual after a time period of light exposure, the control device comprising:
circuitry configured to execute:
a first determining function configured to determine a target light setting of the light source based on a target light profile of the individual comprising time-resolved information about circadian stimuli and color temperatures of light that the individual is to be exposed to, and an actual light profile of the individual comprising information about circadian stimuli and color temperatures of light the individual has been exposed to, wherein the target light setting comprises information about a circadian stimulus and a color temperature of light to be emitted by the light source and is determined such that the actual light profile and the target light profile are aligned over time;
a comparing function configured to compare the target light setting with a light space, wherein the light space is a range of circadian stimuli and a range of color temperatures of light that the light source can emit;
a setting function configured to, in response to the target light setting being within the light space, set the target light setting as the light setting of the light source; and
a second determining function configured to, in response to the target light setting being outside the light space, determine an allowable light setting based on the target light setting and the light space, such that the allowable light setting is within the light space; and
wherein the setting function is further configured to, in response to the target light setting being outside the light space, set the allowable light setting as the light setting of the light source.

10. The control device according to claim 9, wherein the circuitry is further configured to execute a third determining function configured to determine an overlap between the range of circadian stimuli and the range of color temperatures of light that the light source can emit, and at least one range of circadian stimuli and at least one range of color temperatures of light allowed by at least one current activity of the individual; and
wherein the light space is the determined overlap.

11. The control device according to claim 9, wherein the circuitry is further configured to execute a fourth determining function configured to:
determine a first overlap between the range of circadian stimuli and the range of color temperatures of light that the light source can emit, and a range of circadian stimuli and a range of color temperatures of light allowed by a first current activity of the individual, wherein the first current activity is associated with a first priority;
determine a second overlap between the range of circadian stimuli and the range of color temperatures of light that the light source can emit, and a range of circadian stimuli and a range of color temperatures of light allowed by a second current activity of the individual, wherein the second current activity is associated with a second priority; and
wherein the light space is the first overlap in case the first priority is higher than the second priority, and the second overlap in case the second priority is higher than the first priority.

12. The control device according to claim 9, wherein the first determining function is further configured to determine the target light setting further based on a range of circadian stimuli and a range of color temperatures of light allowed by a future activity of the individual.

13. The control device according to claim 9, wherein the second determining function is configured to:
in case the circadian stimulus of the target light setting is within the range of circadian stimuli of the light space and the color temperature of the target light setting is outside the range of color temperatures the light space:
select a color temperature within the range of color temperatures of the light space that fulfills the circadian stimulus of the target light setting, and
set the circadian stimulus of the target light setting and the selected color temperature as the allowable light setting,
in case the circadian stimulus of the target light setting is outside the range of circadian stimuli of the light space and the color temperature of the target light setting is within the range of color temperatures of the light space:

select a circadian stimulus, within the range of circadian stimuli of the light space, that fulfills the color temperature of the target light setting, and set the selected circadian stimulus and the color temperature of the target light setting as the allowable light setting, or in case the circadian stimulus of the target light setting is within the range of circadian stimuli of the light space and the color temperature of the target light setting is within the range of color temperature of the light space:

select a color temperature within the range of color temperatures of the light space that fulfills the circadian stimulus of the target light setting, and set the circadian stimulus of the target light setting and the selected color temperature as the allowable light setting, or select a circadian stimulus, within the range of circadian stimuli of the light space, that fulfills the color temperature of the target light setting, and set the selected circadian stimulus and the color temperature of the target light setting as the allowable light setting.

14. The control device according to claim 9, wherein the second determining function is configured to:

select a color temperature and a circadian stimulus within the light space which minimizes a difference between the selected color temperature and the color temperature of the target light setting and a difference between the selected circadian stimulus and the circadian stimulus of the target light setting; and set the selected color temperature and the selected circadian stimulus as the allowable light setting.

15. The control device according to claim 9, wherein the light source is an electronic display.

* * * * *